(12) United States Patent
Yamaguchi et al.

(10) Patent No.: US 6,948,474 B2
(45) Date of Patent: Sep. 27, 2005

(54) CYLINDER DIRECT INJECTION TYPE INTERNAL COMBUSTION ENGINE

(75) Inventors: Junichi Yamaguchi, Naka (JP); Yoshiyuki Tanabe, Hitachinaka (JP); Koji Onishi, Hitachinaka (JP); Toshio Ishii, Mito (JP); Hiroshi Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/482,286

(22) PCT Filed: Jul. 2, 2001

(86) PCT No.: PCT/JP01/05712
§ 371 (c)(1),
(2), (4) Date: Dec. 30, 2003

(87) PCT Pub. No.: WO03/010428
PCT Pub. Date: Feb. 6, 2003

(65) Prior Publication Data
US 2004/0168671 A1 Sep. 2, 2004

(51) Int. Cl.⁷ .............................................. F02B 15/00
(52) U.S. Cl. ....................... 123/295; 123/298; 123/305; 123/636
(58) Field of Search ................ 123/295, 298, 123/299, 305, 636–641

(56) References Cited

U.S. PATENT DOCUMENTS

| | | | |
|---|---|---|---|
| 4,112,890 A | * 9/1978 | Manger et al. | 123/637 |
| 4,753,213 A | 6/1988 | Schlunke et al. | |
| 5,207,058 A | 5/1993 | Sasaki et al. | |
| 5,666,916 A | * 9/1997 | Fujieda et al. | 123/295 |
| 5,894,826 A | * 4/1999 | Jaye | 123/299 |
| 6,035,824 A | * 3/2000 | Lee | 123/636 |
| 6,186,130 B1 | * 2/2001 | Skinner et al. | 123/637 |
| 6,267,107 B1 | * 7/2001 | Ward | 123/636 |
| 6,334,427 B1 | * 1/2002 | Nakayama et al. | 123/298 |
| 6,499,456 B1 | * 12/2002 | Nogi et al. | 123/295 |
| 6,557,532 B1 | * 5/2003 | Nakayama et al. | 123/299 |
| 6,659,075 B1 | * 12/2003 | Tokuyasu et al. | 123/305 |
| 6,748,917 B1 | * 6/2004 | Hoffmann et al. | 123/295 |
| 6,748,919 B2 | * 6/2004 | Abo et al. | 123/299 |

FOREIGN PATENT DOCUMENTS

| | | |
|---|---|---|
| JP | 11082029 A | 3/1999 |
| JP | 2000-179377 | 6/2000 |
| JP | 2000-179441 | 6/2000 |

OTHER PUBLICATIONS

European Search Report mailed Jun. 25, 2004.

* cited by examiner

Primary Examiner—Erick Solis
(74) Attorney, Agent, or Firm—Crowell & Moring LLP

(57) ABSTRACT

An internal combustion engine which injects fuel directly into a cylinder 104 and ignites air-fuel mixture formed in the cylinder, wherein each fuel injection of said internal combustion engine comprises a lead spray 105 which moves faster and a main spray 106 which moves slower, the lead spray 105 is oriented towards an ignition plug 114, and the air-fuel mixture made by pre- and main sprays is ignited twice or more.

This invention of the above configuration can provide a simple and inexpensive direct cylinder injection type internal combustion engine which reduces abrasion of electrodes and consumption of electric power while assuring stable fuel combustions even when ignition timing is retarded.

11 Claims, 15 Drawing Sheets

FIG. 4
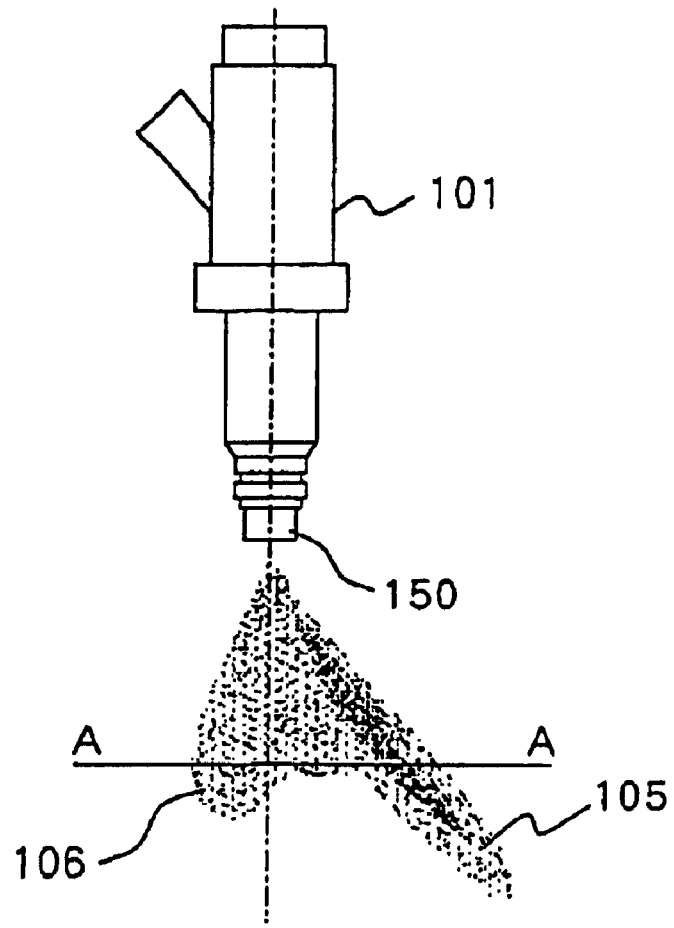
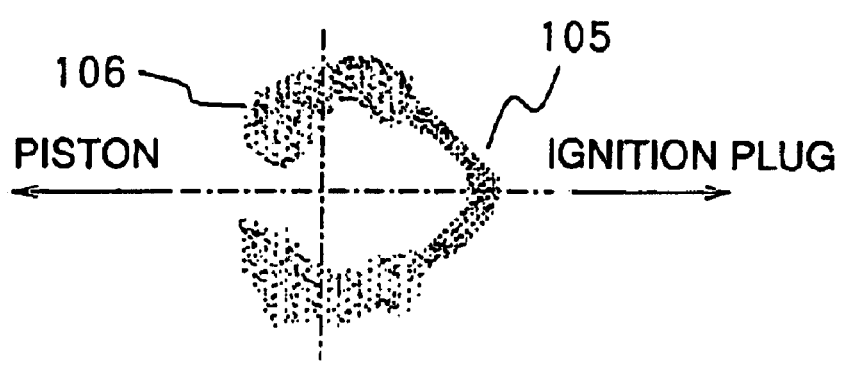
A-A SECTIONAL VIEW

FIG. 18
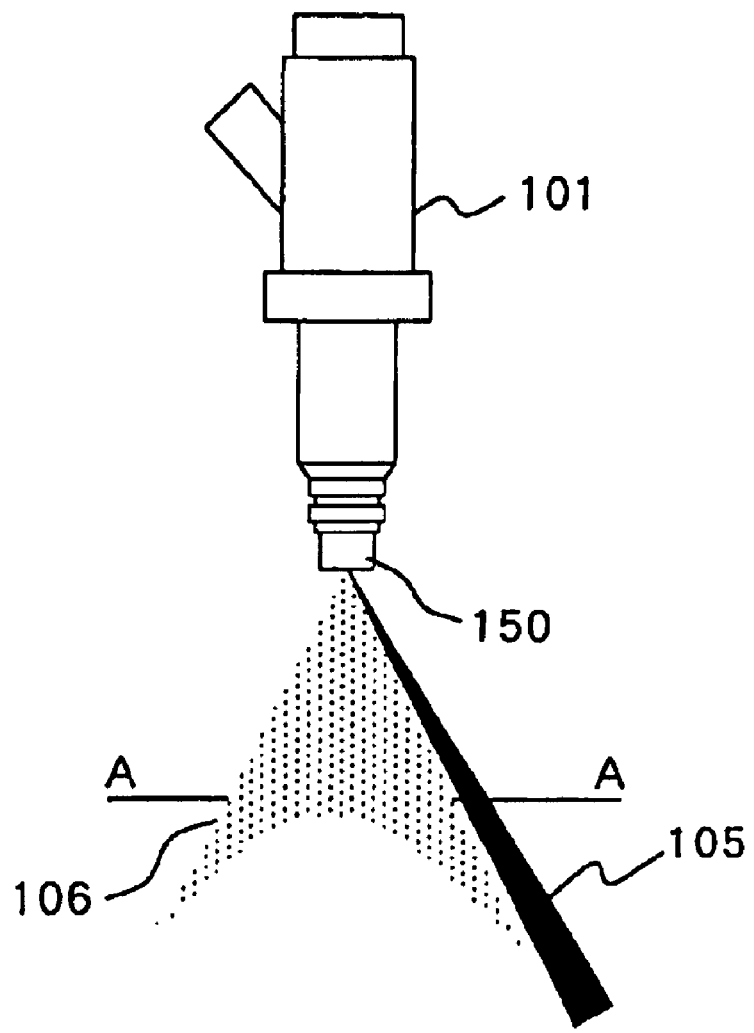
A-A SECTIONAL VIEW
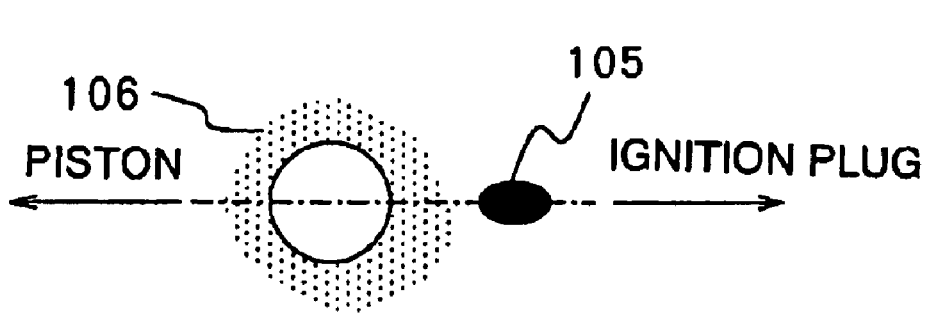

FIG. 20
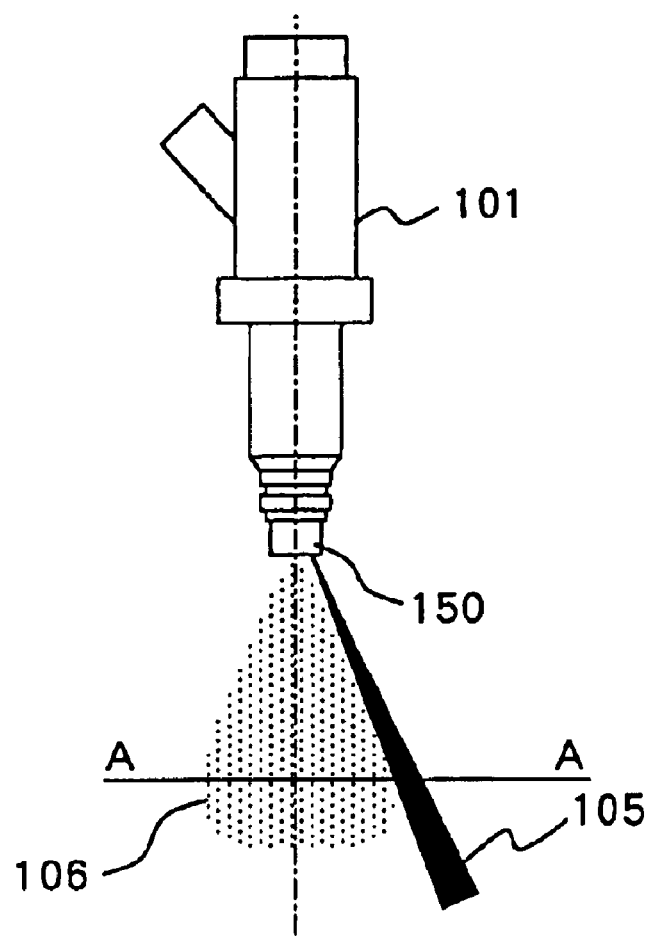
A-A SECTIONAL VIEW
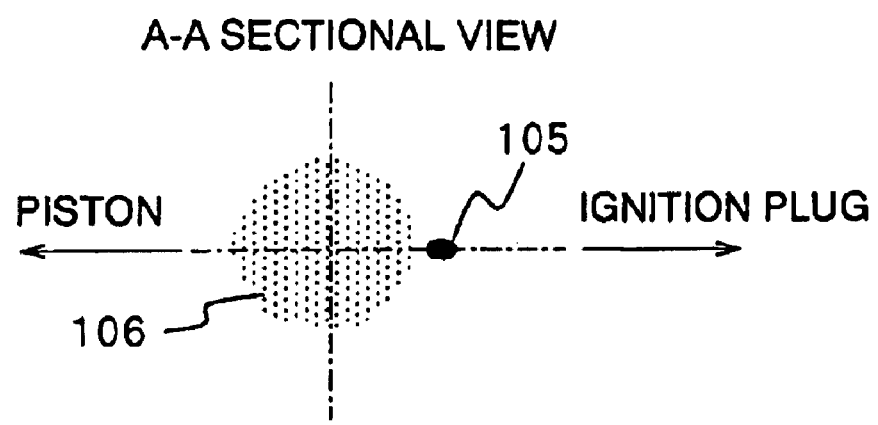

STABLE COMBUSTION AREAS (1200 rpm)

COMPARISON OF COMBUSTION STABILITIES
(UPPER DEAD POINT IGNITION)

CYLINDER DIRECT INJECTION TYPE INTERNAL COMBUSTION ENGINE

FIELD OF THE INVENTION

This invention relates to an internal combustion engine of which fuel can be injected directly into a cylinder, and air-fuel mixture is ignited in the cylinder for combustion.

BACKGROUND OF THE ART

In the internal combustion engine of which fuel is injected directly into the cylinder, when the engine is operated with smaller loads, for example, air-fuel mixture burns by being locally formed near a ignition plug (the combustion is so-called a stratified combustion). Such combustion can reduce fuel consumption and purify the exhaust gas.

In the direct injection type internal combustion engine, a multiple ignition system which generates two or more ignitions per one stroke of the engine, and a multi-point ignition system which uses two or more ignition plugs per one cylinder have been proposed to prevent misfire and improve stability of the combustion. For example, Japanese Application Patent Laid-Open Publication No. 2000-179377 discloses such a multiple ignition system.

The multiple ignition system is equipped with an apparatus for measuring the air-fuel ratio comprising a photoelectric transfer element which is provided near the ignition plug. The ignition system ensures the combustion stability by generating a plurality of ignitions from preset ideal ignition timing to maximum retardation ignition timing while controlling the air-fuel ratio by the feedback control. The multi-point ignition system is disclosed by Japanese Application Patent Laid-Open Publication No. 2000-179441.

Combustion stability can be ensured by measuring the air-fuel ratio near the ignition plug and controlling the air-fuel ratio by feedback control. However, such combustion stability is ensured only when the fuel spray is formed locally near the ignition plug. The combustion stability of the whole inside of the cylinder is not always ensured depending upon the fuel spray characteristics of the injection valve, because most of fuel sprays with characteristics of general conical spray (which is formed in the shape of non-hollow or hollow) do not always go towards the ignition plug. Moreover once ignition per one stroke may not be enough to make a complete combustion even if the ignition is performed between the preset ideal ignition timing and the maximum retardation ignition timing, because fluctuation in the air-fuel ratio distribution is great during this period.

Therefore, the conventional system has ensured the combustion stability by generating multiple ignitions, for example, 4 to 5 ignitions, but this method quickens abrasion of the ignition plug electrode and increases power consumption. Furthermore fuel consumption and exhaust gas may not fully be reduced, since the air-fuel mixture is not always enough stratified. In addition, the ignition timing needs correction since the system is affected by deterioration of the engine with the passage of time. Accordingly the system changes the ignition timing intentionally, and takes the data of the ignition timing in connection with the conditions of the engine at that time, and corrects the ignition timing corrects based on the data. As a result, the system is complicated, and the cost becomes high.

This kind of spark type engine has a catalyst in the exhaust pipe to purify exhaust gas. The catalyst does not function unless its temperature becomes high.

So it is expected to reduce the quantity of exhaust gas by making stable stratified combustions with less fuel until the engine is warmed up after the startup, and to activate the catalyst as early as possible by sending the hot exhaust gas to the exhaust pipe by retarding the ignition timing. For this purpose, there is a method to retard the fuel injection timing. However, when the fuel injection timing is retarded, the pressure in the combustion chamber becomes higher than the conventional spray penetration force and prevents the fuel spray from reaching the ignition plug. This makes the fuel combustion unstable.

An object of the invention is to provide the direct injection type internal combustion engine which can reduce abrasion of electrodes of the ignition plug and consumption of electric power by the simple mechanism while ensuring stable combustion.

Another object of the invention is to provide the direct injection type internal combustion engine which can activate catalyst as early as possible just after the startup of the engine and make the combustion stable by retarding the ignition timing.

DISCLOSURE OF THE INVENTION

To solve the above subjects, the invention is basically characterized by an internal combustion engine of which fuel is injected directly into a cylinder, and air-fuel mixture formed in the cylinder is ignited. Wherein a fuel injection valve injects a fast lead fuel spray toward an ignition plug and a slow main fuel spray following the lead spray. And, air-fuel mixtures containing the lead and main sprays is ignited twice or more according to the operation of the engine.

For example, in the operation of stratified combustion of the internal combustion engine, the fuel injection valve and the ignition unit are controlled so that a lead spray and a main spray are injected in series in a one compression stroke, and when air-fuel mixture of the lead spray near the ignition plug, the first ignition is carried out. Next, after waiting a preset time period, the second ignition is carried out at the timing of which air-fuel mixture of the main spray is formed near the ignition plug.

In accordance with the invention, as the direct fuel spray into the cylinder is divided into the lead spray and the main spray, the fast lead spray is injected directly and intensively toward the ignition plug. The flow of the lead spray forms a secondary flow to guide the main spray to the ignition plug. These sprays are less affected by the pressure in the cylinder during compression stroke than conventional conical sprays. Therefore, air-fuel mixture can be supplied to the ignition plug and its vicinity reliably even when the pressure in the cylinder is high.

Usually, the first ignition can burn air-fuel mixture almost without fail. Even if the first ignition fails to burn the lead spray, the internal combustion engine of this system can burn the main spray by the second or later ignition. Therefore, the invention can prevent knocking of the engine due to misfiring and prevent increase of components in the exhaust gas.

BRIEF DESCRIPTION OF THE DRAWINGS

FIG. 4 illustrates an expansion of fuel sprays jetted from the fuel injection valve 101 of the first embodiment.

FIG. 18 shows an expansion of sprays from the fuel injection valve 101 of FIG. 17.

FIG. 20 shows an expansion of sprays from the fuel injection valve 101 of FIG. 19.

DETAILED DESCRIPTION OF PREFERRED EMBODIMENTS

Several embodiments of the invention will be described and exemplified with reference to the figures.

Figure 1:
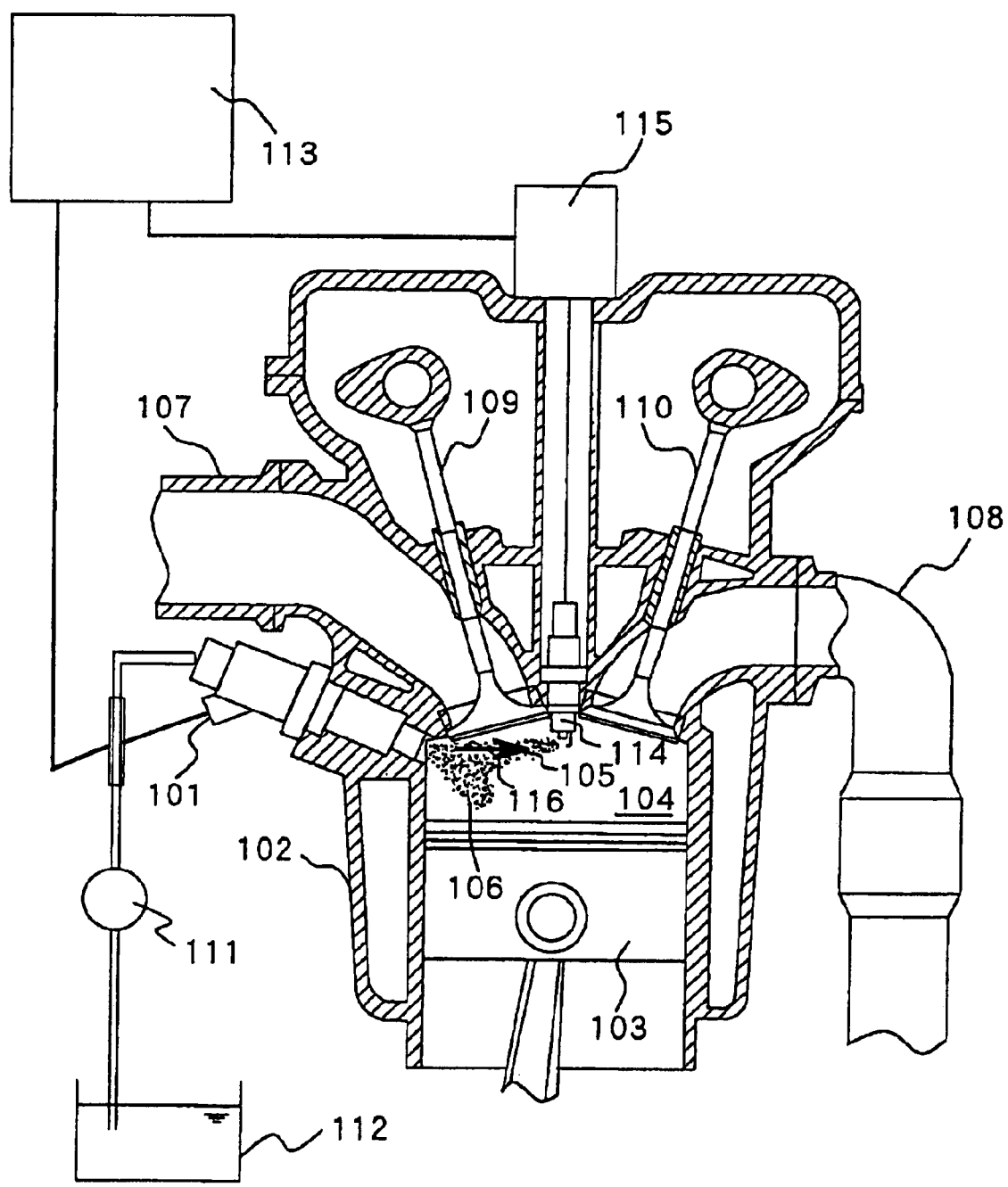
FIG. 1 shows a vertical sectional view of the internal combustion engine which is an embodiment of this invention.

FIG. 1 shows a sectional view of the internal combustion engine which is an embodiment of this invention. Only one of the cylinders of the internal combustion engine is illustrated here for the sake of simplicity.

Each fuel injection valve 101 is mounted on the engine 102 to inject fuel directly into each combustion chamber (or cylinder) 104 of the engine.

A computer (a fuel injection control unit and an ignition control unit) 113 calculates signals for operating the fuel injection valve 101 from various kinds of information such as temperature of engine cooling water, engine revolutions, and intake airflow and outputs the resulting signals. The computer also calculates ignition timing, sends the ignition signal to the ignition coil 115 and controls the ignition plug 114 to generate a spark.

Fuel from the fuel tank 112 is pressured by pump 111 and sent to the fuel injection valve 101.

In the intake stroke, the exhaust valve 110 closes and the intake valve 109 opens. Air comes in from the intake pipe 107.

In the compression stroke, the intake valve 109 closes and the piston 103 goes up. The air in the combustion chamber is compressed. Before the upper dead point, the fuel injection valve 101 injected fuel into the combustion chamber.

The injected fuel comprises a lead spray (also called a preceding spray or initial spray) 105 which go fast towards the ignition plug 114, and a main spray 106 which follows the lead spray (The fuel injection valve which forms these spray patterns will be explained below with reference to FIG. 3.) The ratio of the lead spray to the whole spray is for example 10 to 30% and the ratio of the main spray to the whole spray is for example 90 to 70%.

The timing of when the lead spray 105 reaches the ignition plug 114 is measured in advance and the ignition timing is determined so that the ignition plug 114 may make the first ignition when the lead spray reaches the ignition plug 114.

When the lead spray 105 is fully ignited, the combustion spreads from the lead spray to the main spray and a good stratified combustion is accomplished.

If ignition of the lead spray 105 fails, the main spray 106 expands in the combustion chamber 104 and forms air-fuel mixture near the ignition plug 114. The computer controls the ignition timing so that the second ignition may be made at this moment. This can prevent misfiring.

In the expansion stroke, the force made by the combustion pushes down the piston 103. The crankshaft (not shown in the drawing) converts this down-movement into a rotational torque of the rotary shaft. In the next exhaust stroke, the exhaust valve 110 opens to exhaust the burnt gas to the exhaust pipe 108. With this, one cycle of the internal combustion engine is complete and the intake stroke in the next cycle starts. This cycle is repeated to run the engine.

Figure 2:
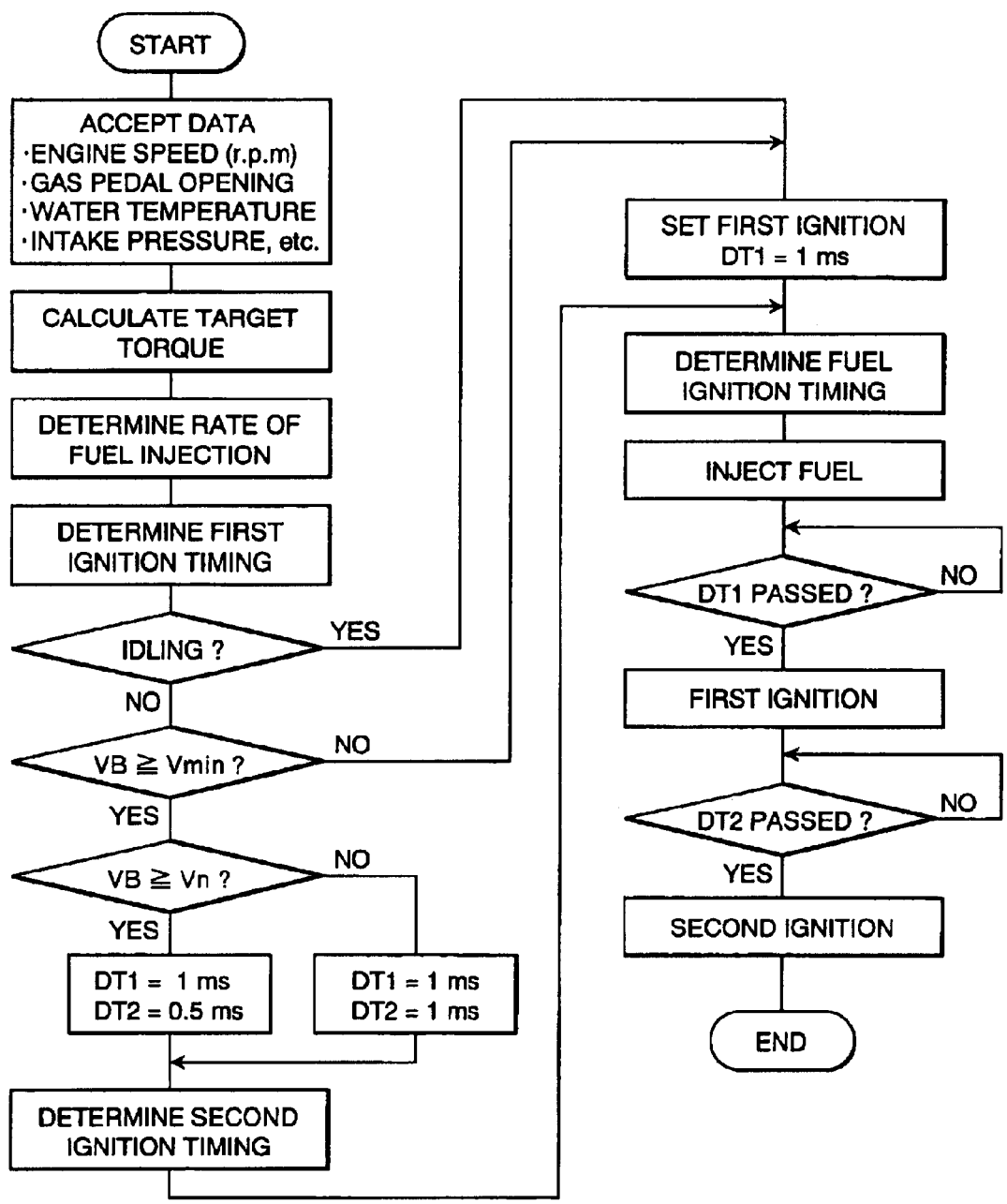
FIG. 2 shows an engine control flow chart of the first embodiment.

FIG. 2 shows an engine control flow chart of the first embodiment.

Referring to FIG. 2, the computer 113 mounted on a vehicle collects various kinds of information such as engine revolutions, gas pedal opening, cooling water temperature, and negative pressure of the intake air and calculates a target torque. The computer 113 determines a fuel injection rate, to say it more concretely, the pulse duration of opening the fuel injection valve. Next, the computer determines the first ignition timing.

Next the computer 113 checks whether the internal combustion engine is idling. Since the quantity of fuel injected in the idling is less, the lead spray 105 is not so much to be ignited easily. Therefore, when finding that the internal combustion engine is idling, the computer sets to make one ignition on the air-fuel mixture of the main spray 106 and determines the fuel injection timing for it.

When detecting that the internal combustion engine is not idling, the computer 113 checks the battery voltage. When the battery voltage VB is equal to or less than the reference voltage (for example 8V, which is called Vmin), the battery has not enough energy to carry out multiple ignitions. The computer 113 sets a single ignition and determines the fuel injection timing for it. When the battery voltage is higher than Vmin, the computer 113 checks whether the battery voltage is equal to or less than the next high reference voltage (for example 9V, which is called Vn).

When the battery voltage VB is equal to or higher than Vn (VB≧Vn), the computer 113 determines a time period (DT1) from the fuel injection to the first ignition and a time period (DT2) from the first ignition to the second ignition, for example, DT1=1 ms and DT2=0.5 ms.

When the battery voltage VB is equal to or lower than Vn (Vn>VB≧Vmin), it takes a time to charge the ignition coil 115 after the first ignition. Therefore, the time DT2 between the first ignition and the second ignition is made longer than that (DT2) when the battery voltage VB is equal to or higher than Vn (VB≧Vn), for example, DT2=1 ms. The time DT1 need not be changed (which can be equal to the DT1 when the battery voltage VB is equal to or higher than Vn (VB≧Vn)).

The computer 113 determines the fuel injection timing, the first ignition timing, and the second ignition timing from these DT1 and DT2 values and the predetermined first ignition timing as the reference.

When the fuel injection timing, the first ignition timing, and the second ignition timing are determined, the computer 113 carries out fuel injection and ignitions in sequence. With this, one combustion cycle is complete. The computer repeats the above for the next combustion. In the above control, two or more ignitions per one stroke are made in the stratified combustion mode (when the load of vehicle is small). One ignition per a stroke is made in a homogeneous combustion mode in which sprays are homogenized in the combustion chamber (when the load of vehicle is large).

Figure 3:
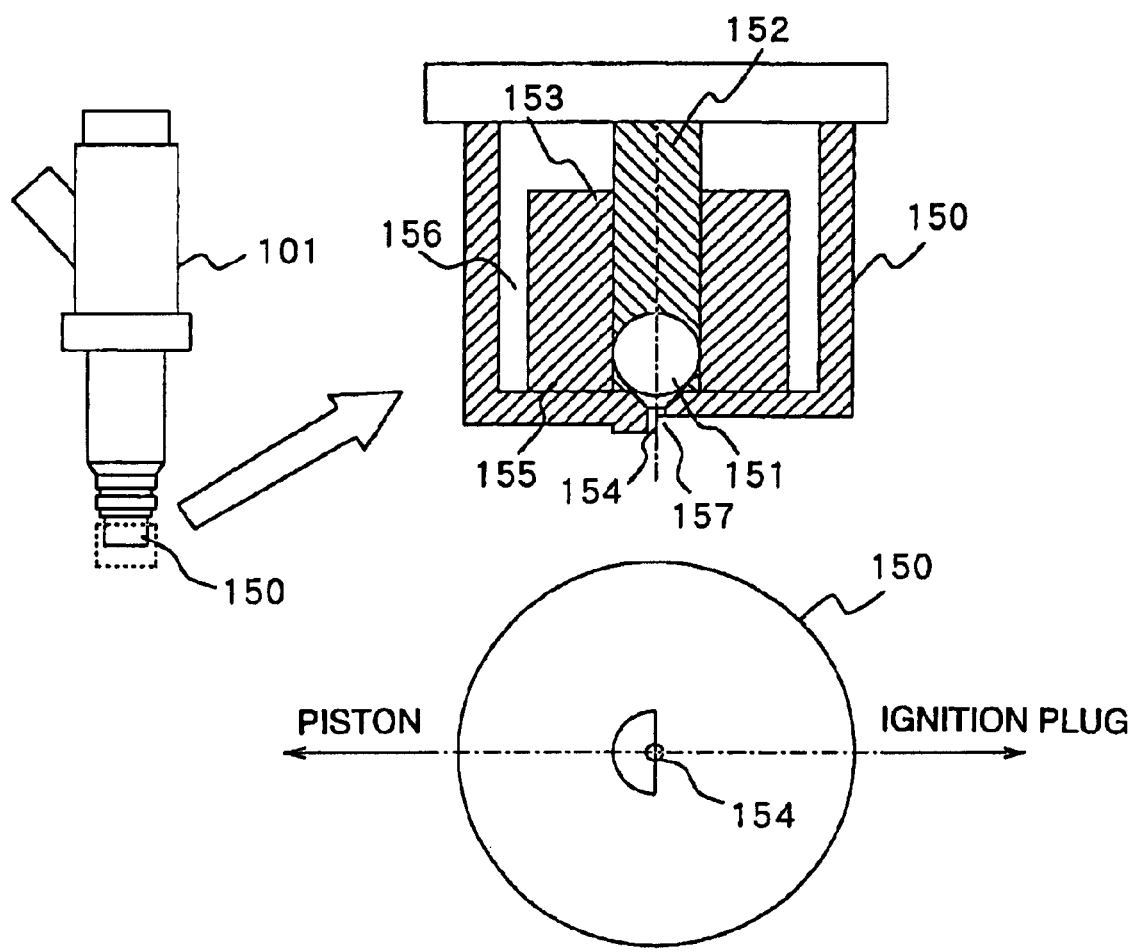
FIG. 3 shows the configuration of the fuel injection valve 101 of the first embodiment.

FIG. 3 and FIG. 4 shows the configuration of the fuel injection valve 101 and the nozzle of this embodiment and how fuels expand in the fuel chamber.

The fuel injection valve (hereinafter called as an injector) 101 of FIG. 3 comprises an electric valve which opens and closes by the on/off operations of a magnet coil (not shown in the drawing) in the injector body.

The injector nozzle 150 mainly comprises a ball valve 151, a rod 152 connected thereto, a swirler (a fuel swirling element) 153 to give a swirling force, and a jet orifice 154 having a cut 157 whose sectional view is L-shaped.

When the magnet coil is energized, the rod 152 is attracted by a magnetic force against the force of a return spring (not shown in the drawing). The ball valve 151 moves away from the valve seat and thus the valve opens. The swirler 153 has a plurality of axial fuel passages 156 (also called axial fuel grooves) on its outer periphery and a plurality of radial fuel passages 155 (also called radial fuel grooves) which are eccentrically provided on the bottom of the swirler towards the center of the swirler and connected to the axial fuel passages 156.

When the ball valve 151 opens, the fuel in the injector flows from the axial fuel grooves 155 to the radial grooves 156 and this flow gives a peripheral swirling force to the fuel spray.

The jet orifice 154 of the injector 101 is provided with its cut 157 faced to the ignition plug 114.

FIG. 4 shows a behavior of a fuel spray from the injector. Referring to a sectional view taken on line A—A of FIG. 4, the lead spray jets out towards the ignition plug 114 prior to a main spray from the cut 157 formed on the jet orifice 154 as the lead spray 105 is higher in flow density and velocity than the main spray 106. The main spray formed here is conical and partially has a gap in it. Therefore, the lead spray 105 goes further than the main spray 106 (that is, the lead spray 105 has a greater penetration and a longer carry distance than the main spray 6). The lead spray 105 forms a flow 116 (not shown in the drawing) towards the ignition plug. This enables the main spray 106 to flow toward the ignition plug 114.

The behavior of sprays, air-fuel mixtures, and ignitions in this embodiment will be explained below with reference to FIG. 5 to FIG. 10, assuming that the internal combustion engine 102 is just started, that is, so-called fast-idling.

FIG. 5 to FIG. 10 show vertical sectional views and top sectional views of the internal combustion engine as the compression stroke advances. In the intake stroke before entering the status of FIG. 5 and FIG. 6), the intake valve 109 opens and lets air come into the combustion chamber 104 through the intake port 107 as the piston goes down. The slant configuration of the intake port 107 can cause a weak tumble flow (lengthwise vortex flow) in the combustion chamber 104. Although this embodiment is not equipped with a apparatus for generating a tumble flow, this embodiment can have an effect similar to that of the apparatus. This embodiment does not limit the provision of the apparatus for generating the tumble flow.

In the succeeding compression stroke, the intake valve 109 is closed. As the piston 103 goes up, the temperature and the pressure in the combustion chamber 104 go higher and the tumble flow becomes attenuated. When the piston 103 is almost near the upper dead point, the tumble flow generated in the combustion chamber 104 is broken into a disturbed flow.

In the case of ignition for retardation, as the ignition timing is set almost near the upper dead point, the injection timing for fuel is set at the position of which the crank angle is about 40° before the piston 103 reaches the upper dead point. The optimum fuel injection timing is dependent upon engine characteristics.

Figure 5:
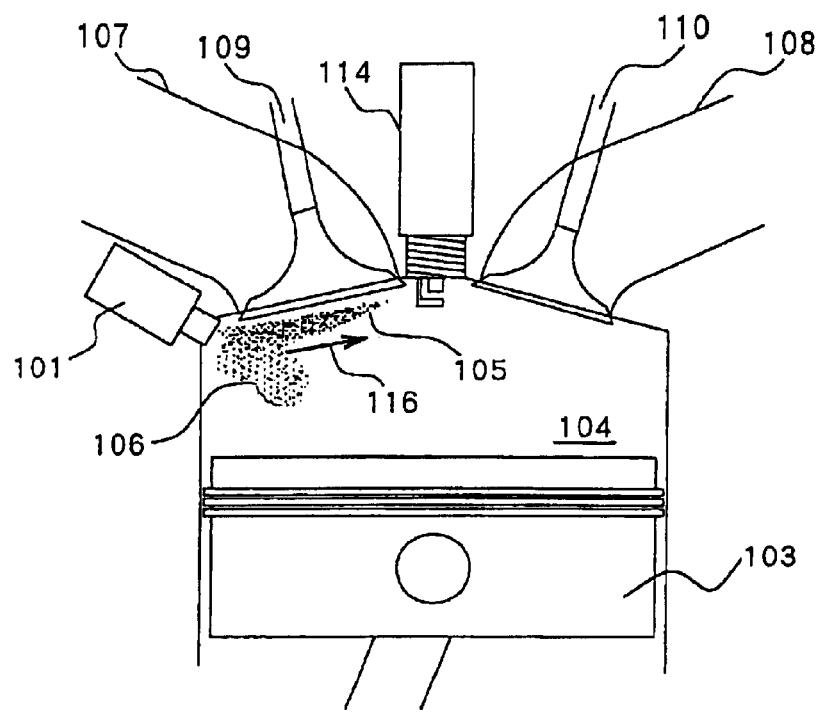
FIG. 5 shows a vertical sectional view of the combustion chamber of the first embodiment in which the fuel injection valve just injected fuel.
Figure 6:
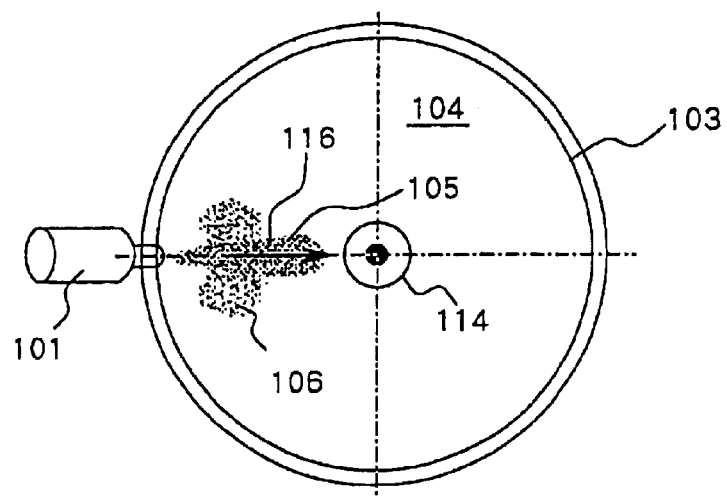
FIG. 6 shows a top sectional view of the combustion chamber of the first embodiment in which the fuel injection valve just injected fuel.

FIG. 5 and FIG. 6 show how the fuel spray behaves in the combustion chamber just after it is injected. FIG. 5 and FIG. 6 respectively show vertical and top sectional views of the combustion chamber into which the fuel injection valve just injected fuel.

At this time point, as the internal combustion engine 102 is in the compression stroke, the intake valve 109 and the exhaust valve 110 are both closed. The air taken into the combustion chamber is compressed as the piston 103 goes up. The injector 101 injects fuel into this compressed air. The fuel spray jetted from the injector 101 has two flows comprised of the lead spray 105 which goes fast towards the ignition plug 114 and the main spray 106 which goes slowly following the lead spray. As the lead spray 105 is higher speed and higher density compared with the main spray 106, the lead spray reaches near the ignition plug prior to the main spray. Behind the lead spray, the main spray goes towards the piston 103. The lead spray 105 causes a friction between the lead spray 105 and the air taken into the combustion chamber 104, and this friction generates a jet flow 116 from the injector 101 to the ignition plug 114.

Contrarily, the main spray 106 does not form a jet flow as it is widespread and its density is low.

As the jet flow 116 is generated from the lead spray itself, it is hard to be affected by the running condition (e.g. engine revolutions) of the internal combustion engine and the behavior of the spray is stable.

Figure 7:
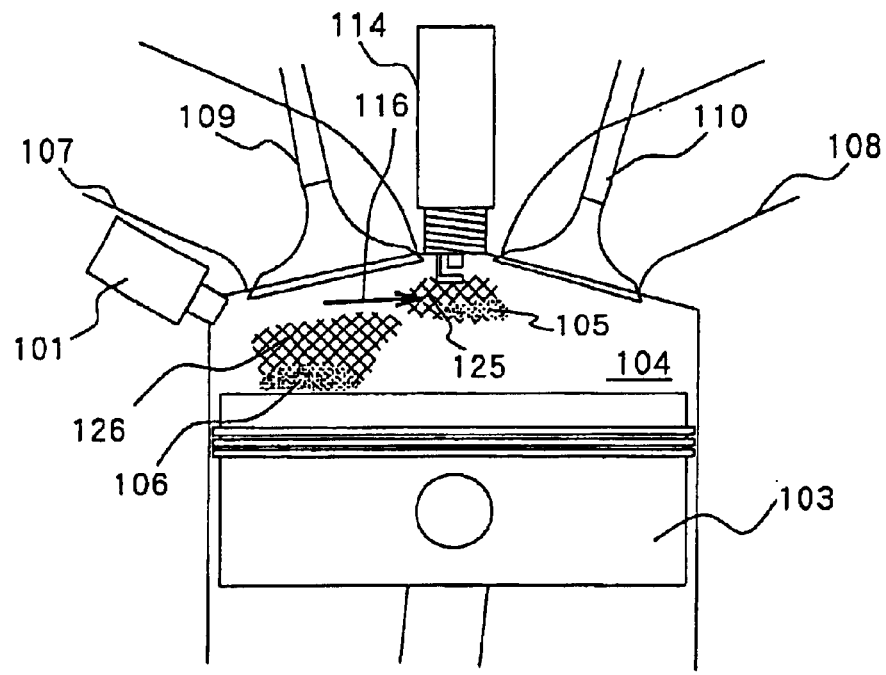
FIG. 7 shows a vertical sectional view of the combustion chamber of the first embodiment which explains how the fuel sprays behave about 20° before the upper dead point of the first embodiment.
Figure 8:
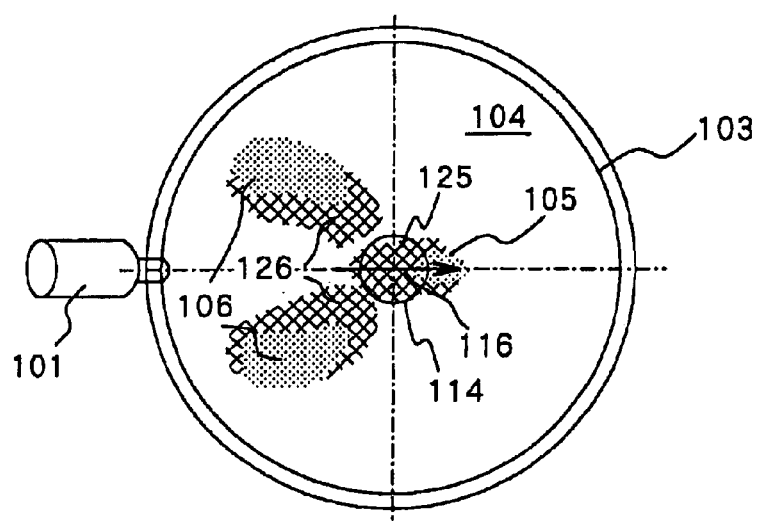
FIG. 8 shows a top sectional view of the combustion chamber of the first embodiment which explains how the fuel sprays behave about 20° before the upper dead point of the first embodiment.

FIG. 7 and FIG. 8 respectively show vertical and top sectional views of the combustion chamber illustrating how the fuel spray behaves when the piston is before about 20° from the upper dead point. As the time goes by, the piston 103 goes up and the main spray 106 is stagnated near the top of the piston. At this time, the above jet flow 116 guides air-fuel mixture 126 made from the main spray 106 which evaporates to easily catch fire toward the ignition plug 114.

The lead spray 105 evaporates while passing by the ignition plug 114 and forms air-fuel mixture 125 around the ignition plug 114. The ignition plug 114 makes an ignition at the first preset ignition timing. The computer determines this ignition timing by estimating the spray velocity in advance, calculating a time required for the fuel spray to reach the ignition plug from this spray velocity and the distance between the injector and the ignition plug, and adding this time value to the fuel injection timing.

When the lead spray 105 is successfully ignited, the combustion expands from the lead spray to the main spray and this makes a preferable stratified combustion.

Figure 9:
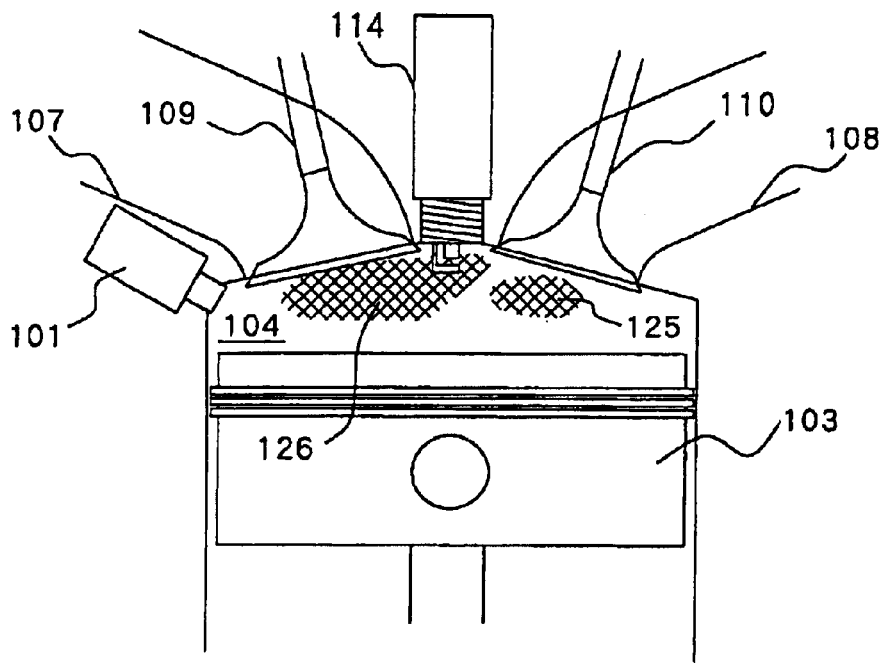
FIG. 9 shows a vertical sectional view of the combustion chamber of the first embodiment which explains how the fuel sprays behave near the upper dead point when the combustion of the air-fuel mixture fails.
Figure 10:
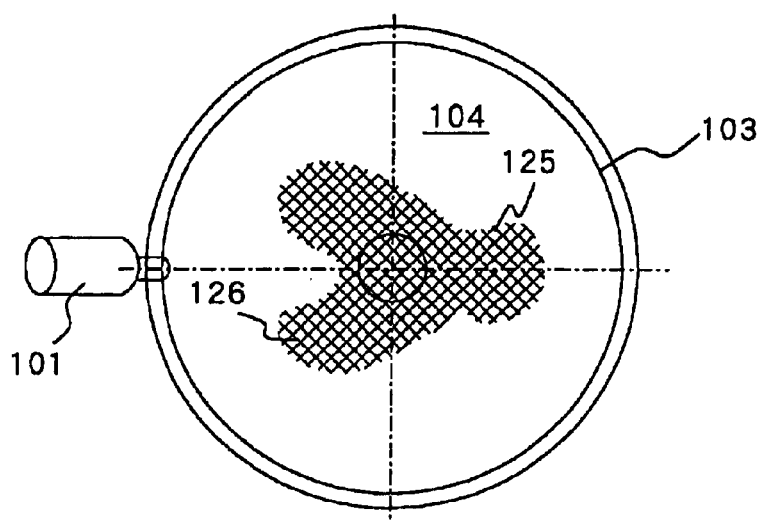
FIG. 10 shows a top sectional view of the combustion chamber of the first embodiment which explains how the fuel sprays behave near the upper dead point when the combustion of the air-fuel mixture fails.

FIG. 9 and FIG. 10 respectively show vertical and top sectional views of the combustion chamber illustrating how the fuel spray behaves when the ignition of the air-fuel mixture from the lead spray fails in FIG. 7 and FIG. 8.

As the piston 103 comes closer to the upper dead position, the gas pressure in the combustion chamber 104 increases rapidly and the jet flow 116 disappears before the air-fuel mixture 126 (from the main spray 106) reaches the ignition plug 114. Consequentially the air-fuel mixture 126 moves slower near the ignition plug 114 and can be stratified there without passing by the ignition plug further.

The lead spray 105 which produced the jet flow 116 is evaporated almost completely as the piston 103 goes up, mixed up with air into air-fuel mixture 125, and stratified just after the ignition plug 114.

The computer 113 of FIG. 1 controls the ignition timing to make the second ignition for the air-fuel mixture 126. This can prevent failure in ignition and combustion of the fuel spray (which is a so-called misfiring). Further, it is possible to give the third or more ignitions to assure combustion as the air-fuel mixture 126 stays near the ignition plug 114 comparatively steadily.

In summary, this embodiment can stratify the air-fuel mixture 125 from the lead spray and the air-fuel mixture 126 from the main spray around the ignition plug 114 and burn these stratified air-fuel mixtures steadily by sequential combustions.

FIG. 11 to FIG. 16 illustrate behaviors of fuel sprays, air-fuel mixtures, and ignitions in the second embodiment of the invention. The second embodiment is basically the same as the first embodiment in configuration. The basic configuration of the injector of the second embodiment is the same as that of FIG. 3 or FIG. 4. The internal combustion engine of the second embodiment has an auxiliary ignition plug 201 just above the injector 101 in addition to the ignition plug 114 near the top of the combustion chamber.

Figure 11:
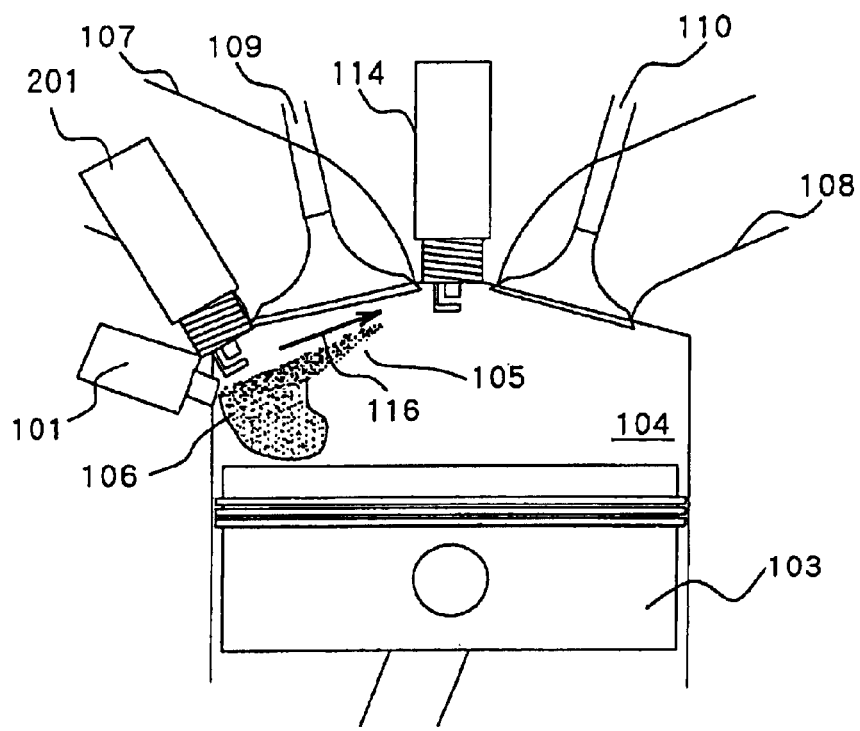
FIG. 11 shows a vertical sectional view of the combustion chamber of the second embodiment in which the fuel injection valve just injected fuel.
Figure 12:
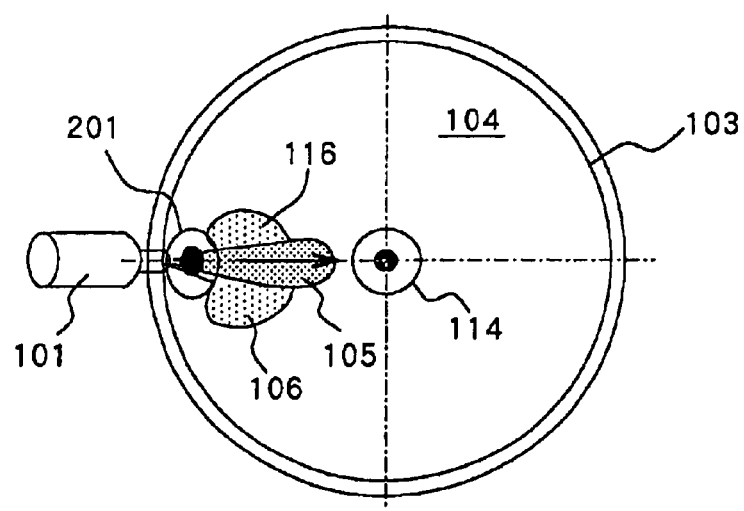
FIG. 12 shows a top sectional view of the combustion chamber of the second embodiment in which the fuel injection valve just injected fuel.

FIG. 11 and FIG. 12 respectively show vertical and top sectional views of the combustion chamber illustrating how the sprays behave just after they are injected.

Here, the internal combustion engine 102 is in the compression stroke. The intake valve 109 and the exhaust valve 110 are closed. The air taken in the combustion chamber is compressed as the piston 103 goes up. Then, the injector 101 jets fuel into the combustion chamber. The fuel spray jetted from the injector 101 comprises a main spray 106 which flows slowly and a lead spray 105 which flows fast towards the ignition plug 114.

As this embodiment contains an auxiliary ignition plug 201, the relationship between the injector and the ignition plug of this embodiment is different from that of the first embodiment. (The injector 101 of the second embodiment is provided lower than that of the first embodiment.) Therefore, the injector of the second embodiment jets fuel more widely.

The fast high-density lead spray 105 reaches the ignition plug or its vicinity prior to the main spray 106. Behind the lead spray, the main spray 106 goes towards the piston 103. In this case, the lead spray 105 causes a friction between the lead spray 105 and the air taken into the combustion chamber 104 and this friction produces a jet flow 116 from the injector 101 to the ignition plug 114. Contrarily, the main spray 106 does not form a jet flow as it is widespread and its density is low.

As the jet flow 116 is produced from a jet flow itself, it is hard to be affected by the running condition (e.g. engine revolutions) of the internal combustion engine and the behavior of the spray is stable.

Figure 13:
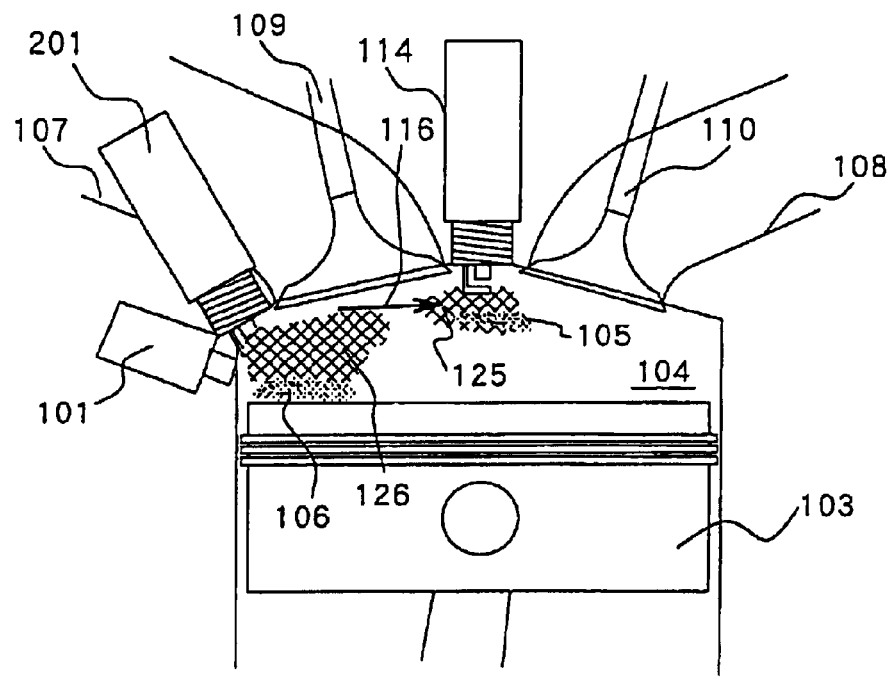
FIG. 13 shows a vertical sectional view of the combustion chamber of the second embodiment which explains how the fuel sprays behave about 20° before the upper dead point of the first embodiment.
Figure 14:
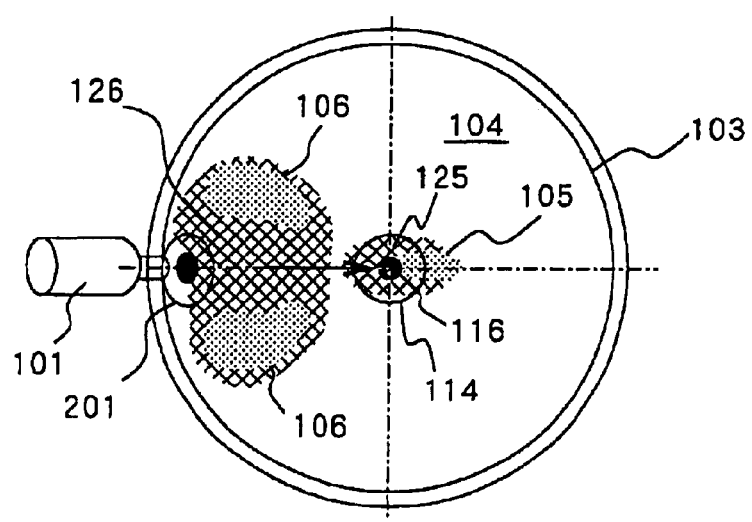
FIG. 14 shows a top sectional view of the combustion chamber of the second embodiment which explains how the fuel sprays behave about 20° before the upper dead point of the first embodiment.

FIG. 13 and FIG. 14 respectively show vertical and top sectional views of the combustion chamber illustrating how the fuel spray behaves when the piston is about 20° before the upper dead point.

As the time goes by, the piston 103 goes up and the main spray 106 is stagnated near the top of the piston. At this time point, the above jet flow 116 guides air-fuel mixture made from the main spray 106 toward the auxiliary ignition plug 201 and the ignition plug 114. With this, air-fuel mixtures which are ready to be burnt are stratified near the ignition plug 114 or 201. It is possible to make an ignition here, but to retard the ignition timing as much as possible as explained in the first embodiment, the steps below are taken.

Figure 15:
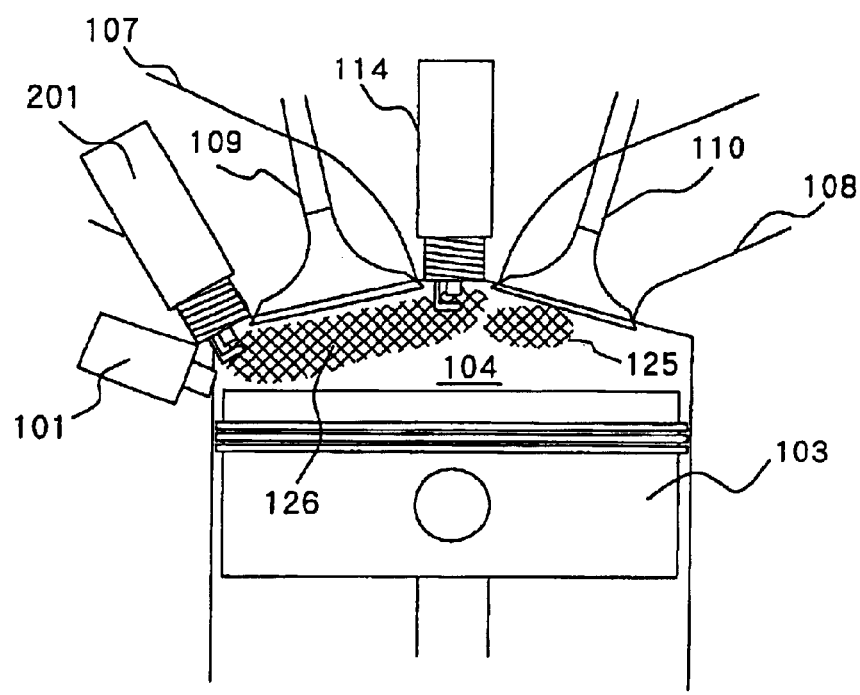
FIG. 15 shows a vertical sectional view of the combustion chamber of the second embodiment which explains how the fuel sprays behave near the upper dead point.
Figure 16:
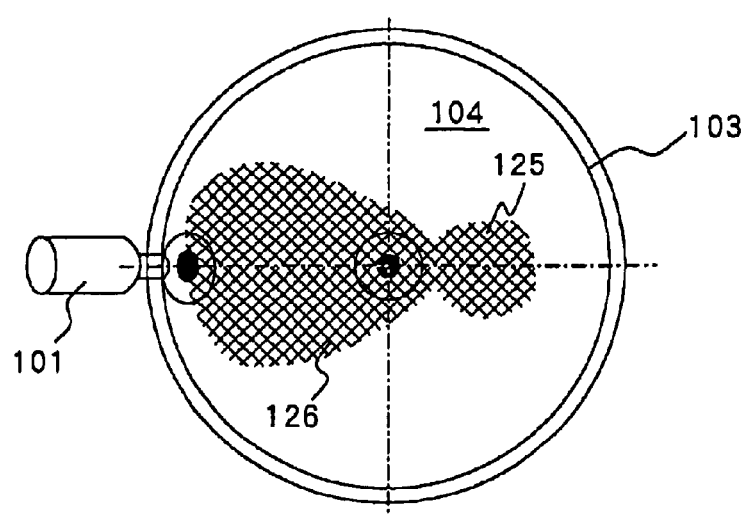
FIG. 16 shows a top sectional view of the combustion chamber of the second embodiment which explains how the fuel sprays behave near the upper dead point.

FIG. 15 and FIG. 16 respectively show vertical and top sectional views of the combustion chamber illustrating how the air-fuel mixtures behave when the piston is near the upper dead point.

As the piston 103 comes closer to the upper dead position, the gas pressure in the combustion chamber 104 increases rapidly and the jet flow 116 disappears before the air-fuel mixture 126 (from the main spray 106) reaches the ignition plug 114.

Consequentially the air-fuel mixture 126 moves slower near the ignition plug 114 and can be stratified there without passing by the ignition plug further.

As the lead spray 105 which produced the jet flow 116 is evaporated almost completely as the piston 103 goes up, the air-fuel mixture 125 is stratified just after the ignition plug 114.

At this time point, the computer 113 of FIG. 1 controls the ignition timing to make both the ignition plug 114 and the auxiliary ignition plug 201 ignite simultaneously or in sequence.

As these ignition plugs make ignitions almost simultaneously, it is possible to extremely reduce the possibility of failures in ignition and combustion of the fuel spray (which is a so-called misfiring). Further, it is possible to give the second or more ignitions (as stated in the first embodiment) to assure combustion of the air-fuel mixtures 125 and 126 as the air-fuel mixture 126 stays near the ignition plug 114 comparatively steadily.

Further, in the idling status in which the internal combustion engine injects less fuel, it is hard to form air-fuel mixture 125 by the lead spray 105 near the ignition plug 114. Therefore, it may be is possible to stop the operation of the ignition plug 114 and to use only the auxiliary ignition plug 201 for ignition. This can suppress the ignition energy and increase the total efficiency of the internal combustion engine 102 while assuring the ignitionability.

The computer 113 controls to perform ignitions by the ignition plugs in the stratified combustion mode and by either of the ignition plugs in the homogeneous combustion mode.

Figure 17:
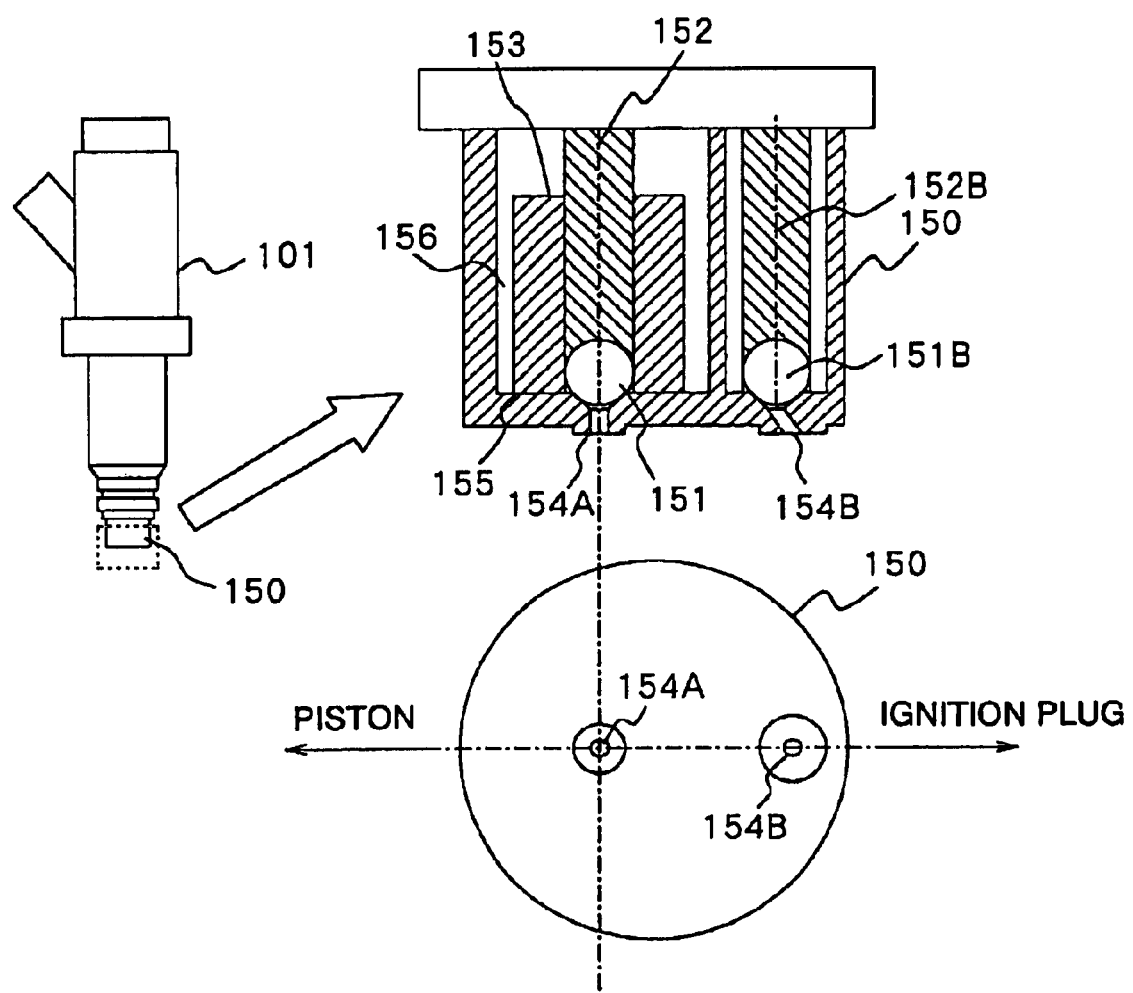
FIG. 17 shows a vertical sectional view of another example of fuel injection valve 101.

FIG. 17 and FIG. 18 respectively show the vertical sectional view of another example of fuel injection valve 101 and a sample expansion of sprays from the fuel injection valve 101.

The nozzle 150 of the injector 101 of this embodiment contains a fuel jet orifice 154A which injects fuel and an air jet orifice 154B which inject air. The air jet orifice 154B of the injector 101 is provided so that air may be jetted toward the ignition plug 114 when the injector 101 is mounted on the internal combustion engine.

The fuel jet orifice 154A are internally the same as that of FIG. 2 but has no cut in the jet orifice. So the fuel jet orifice 154A can form a conical spray whose periphery is uniform. Near the air jet orifice 154B are provided a ball valve. 151B to control air jetting and a rod 152B connected thereto. The compressed air is fed from a high-pressure pump to the upstream side of the air jet orifice 154B through an air pipe (not shown in the drawing). When the ball valve 151B is moved up, a high-pressure air flow is made from the air jet orifice 154B. The air flow is equivalent to a jet flow 116 in the first and second embodiments. One part of the main spray 106 is entangled in air jet flow 116 and guided as a lead spray to the ignition plug 105. This embodiment controls to move the ball valves 151A and 151B at the same time. The invention should not, however, be construed as limited to this embodiment. The ball valve 151B can work a little earlier.

Figure 19:
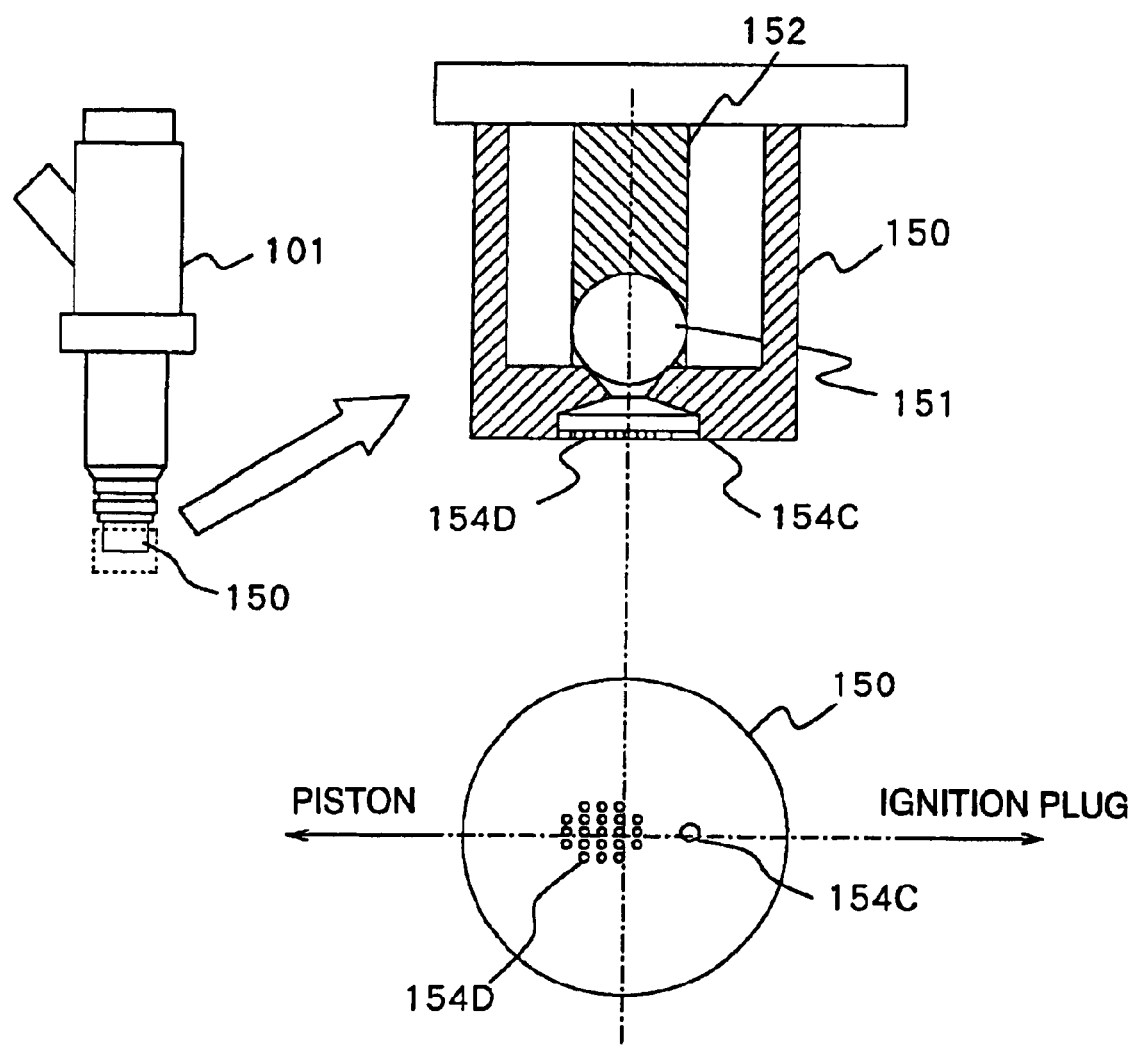
FIG. 19 shows a vertical sectional view of still another example of fuel injection valve 101.

FIG. 19 and FIG. 20 respectively show the vertical sectional view of still another example of fuel injection valve 101 and a sample expansion of sprays from the fuel injection valve 101. The nozzle 150 of the injector 101 of this embodiment contains a fuel jet orifice 154C which forms a lead spray 105 and fuel jet orifices 154D which form a main spray 106. The fuel jet orifice 154C is greater (in the opening diameter) than each fuel jet orifice 154D and oriented so that the lead spray 105 may flow toward the ignition plug 114 when the injector 101 is mounted on the internal combustion engine. A plurality of fuel jet orifices 154D of a smaller opening diameter are provided to jet a quantity of fuel required for the operation of the internal combustion engine and dispersed so that the fuel density of the main spray may be lower.

We inventors experimentally verified the effect of the invention by giving ignitions to the above lead sprays and main sprays.

Figure 21:
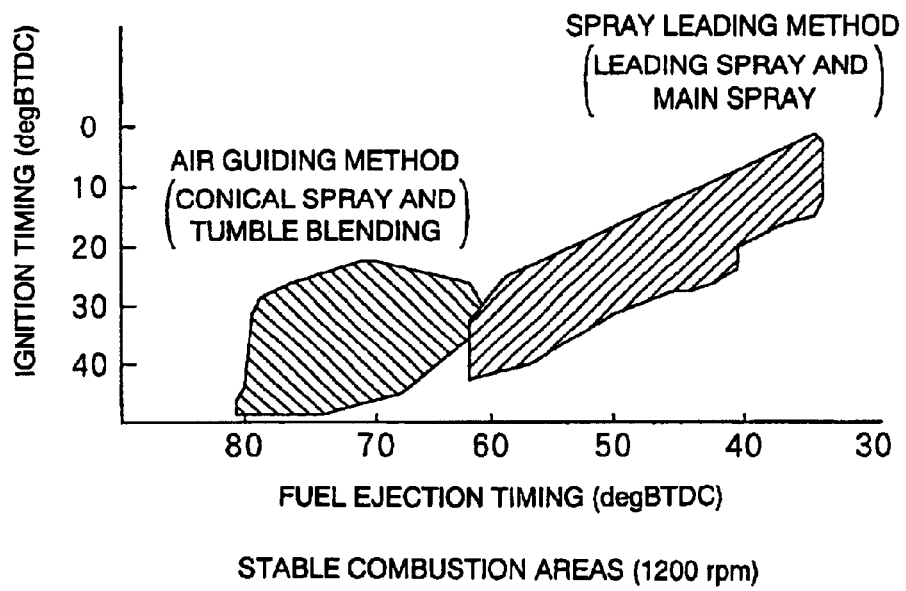
FIG. 21 shows an experimental comparison of stable combustion areas of internal combustion engines of this invention and a conventional example.

FIG. 21 shows an experimental comparison of stable combustion areas of the internal combustion engine of this invention and a conventional example. Here, the air guiding method generates a tumble flow by a tumble generating mechanism provided in the intake port, guides air-fuel mixture to the ignition plug by the tumble flow, and stratifies the air-fuel mixture near the ignition plug. The spray leading method stratifies the air-fuel mixture near the ignition plug by a jet flow produced from a lead spray.

In FIG. 21, the horizontal axis of the graph represents a fuel ejection timing and the vertical axis represents an ignition timing. The left hatched area in the graph represents the stable combustion area of the air guiding method and the right one represents the stable combustion area of the spray leading method. These experiments were done under smaller-loads running condition of the internal combustion engine (1200 r.p.m.).

Referring to FIG. 21, the air guiding method has no stable combustion area after 20° before the upper dead point (BTDC) because this method cannot make a stable combustion when the fuel injection timing is after 60° before the upper dead point (BTDC). Contrarily, we found that the spray leading method can retard the fuel injection timing up to 30° before the upper dead point (BTDC) and can burn fuel steadily even when the ignition timing is near the upper dead point. Further, we found that the spray leading method can reduce the fuel consumption and the quantity of nitrogen oxide emission of the internal combustion engine.

Figure 22:
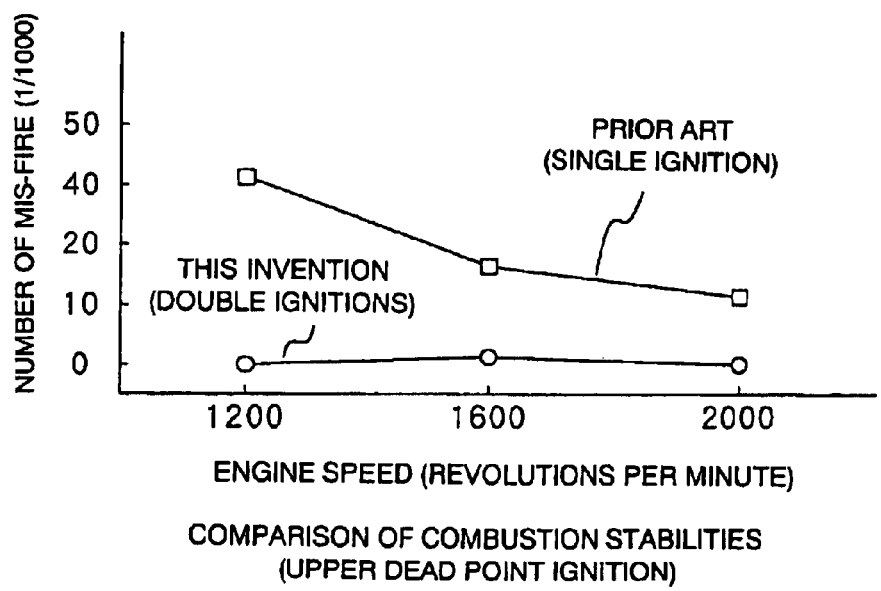
FIG. 22 is a graph indicating an experimental comparison of combustion stabilities of internal combustion engines of this invention and a conventional example.

FIG. 22 is a graph indicating an experimental comparison of combustion stabilities between the case of igniting twice per 1 stroke by the internal combustion engine of this invention and the case of igniting once per 1 stroke by the conventional internal combustion engine.

The conventional engine has caused misfiring at a rate of once per several tens due to fluctuation in the distribution of air-fuel mixtures when the fuel injection timing and the ignition timing are retarded. On the contrary, the engine of the invention can cause no misfiring.

The second embodiment is equipped with two ignition plugs, but the invention is not limited to this embodiment. More ignition plugs can be used as long as they are located at position where sprays from the fuel injection valves are evaporated. Similarly, the ignition plugs can be placed anywhere as long as they do not interfere with the intake valve 109 and the exhaust valve 110. Further, fuel spray shapes can be any as long as the lead spray guides the main spray.

INDUSTRIAL FIELD OF APPLICATION

The invention can assure preferable combustion stabilities even when ignition timings are retarded to activate the catalyst as earlier as possible at the startup of the internal combustion engine by sequentially igniting two air-fuel mixtures comprising the lead spray and the main spray. Further, the direct cylinder injection type internal combustion engine system of the invention is simpler and less expensive than a conventional multi-ignition system and further can reduce abrasion of electrodes and consumption of electric power.

What is claimed is:

1. An internal combustion engine of which fuel is injected directly into a cylinder, whereby an air-fuel mixture formed in the cylinder is ignited; comprising:
   a fuel injection valve which injects a fuel spray including a lead fuel spray toward an ignition plug and a main fuel spray following the lead spray per fuel injection, and
   an ignition control unit which ignites air-fuel mixtures containing said lead and main sprays twice or more executes a first ignition at point in time where an air-fuel mixture of said lead spray reaches said ignition plug and executes a second ignition at point in time where an air-fuel mixture of said main spray reaches said ignition plug.

2. The internal combustion engine of claim 1 wherein said ignition control unit has a function of switching the number of ignitions for said lead and main fuel sprays to any one of plural times and 1 time according to the operation of the internal combustion engine.

3. The internal combustion engine of claim 1, wherein said ignition control unit has a function of switching to either of ignitions by plural ignition plugs and ignition by one ignition plug according to the operation of the internal combustion engine.

4. The internal combustion engine of claim 1 wherein said ignition control unit monitors a battery voltage and controls to reduce the number of ignitions when the voltage falls.

5. The internal combustion engine of claim 1, further comprising:
a means for monitoring a battery voltage and
an ignition control apparatus which varies time interval or crank angle interval equal to the interval of ignition timings according to the battery voltage when igniting the air-fuel mixture twice or more.

6. The internal combustion engine of claim 5, wherein a first ignition has an interval of 1 ms or more interval after fuel is injected, a second ignition has an interval of 0.5 ms or more after the first ignition, a third ignition has an interval of 0.5 ms or more after the second ignition, and so on.

7. The internal combustion engine of claim 1, wherein a first ignition timing is first determined, and then a fuel injection timing is determined, and a second and later ignition timings are determined if necessary.

8. The internal combustion engine of claim 1, wherein the velocity of flow of said lead fuel spray is faster than that of said main fuel spray.

9. The internal combustion engine of claim 1, wherein said engine has two or more ignition plugs per cylinder.

10. The internal combustion engine of claim 1, wherein said engine has two ignition plugs per cylinder, whereby said first ignition and second ignition timing are arranged to be executed at the same time or different timing with these ignition plugs.

11. The internal combustion engine of claim 1, wherein a first ignition has an interval of 1 ms or more interval after fuel is injected, a second ignition has an interval of 0.5 ms or more after the first ignition, a third ignition has an interval of 0.5 ms or more after the second ignition, and so on.

* * * * *